(12) United States Patent
Henry et al.

(10) Patent No.: US 7,966,806 B2
(45) Date of Patent: Jun. 28, 2011

(54) TURBOFAN ENGINE ASSEMBLY AND METHOD OF ASSEMBLING SAME

(75) Inventors: John Leslie Henry, Westchester, OH (US); Robert Joseph Orlando, West Chester, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 1058 days.

(21) Appl. No.: 11/555,097

(22) Filed: Oct. 31, 2006

(65) Prior Publication Data

US 2008/0098718 A1    May 1, 2008

(51) Int. Cl.
  *F02K 3/02* (2006.01)
  *F02K 3/072* (2006.01)
(52) U.S. Cl. ................ 60/226.1; 60/268; 60/39.162
(58) Field of Classification Search ............ 60/226.1, 60/268, 39.162
  See application file for complete search history.

(56) References Cited

U.S. PATENT DOCUMENTS

| 3,673,802 | A | * | 7/1972 | Krebs et al. ............... 60/226.1 |
| 3,729,957 | A | * | 5/1973 | Petrie et al. ............... 60/268 |
| 4,751,816 | A |   | 6/1988 | Perry |
| 4,790,133 | A |   | 12/1988 | Stuart |
| 4,827,712 | A |   | 5/1989 | Coplin |
| 6,158,210 | A | * | 12/2000 | Orlando ................ 60/226.1 |
| 6,339,927 | B1 |  | 1/2002 | DiPietro, Jr. |
| 6,684,626 | B1 |  | 2/2004 | Orlando et al. |
| 6,739,120 | B2 |  | 5/2004 | Moniz et al. |
| 6,763,652 | B2 |  | 7/2004 | Baughman et al. |
| 6,763,653 | B2 |  | 7/2004 | Orlando et al. |
| 6,763,654 | B2 |  | 7/2004 | Orlando et al. |
| 7,186,073 | B2 |  | 3/2007 | Orlando et al. |
| 7,334,392 | B2 | * | 2/2008 | Moniz et al. ............... 60/204 |

FOREIGN PATENT DOCUMENTS

EP          0558769       *  2/1992

* cited by examiner

*Primary Examiner* — Ted Kim
(74) *Attorney, Agent, or Firm* — William Scott Andes, Esq.; Armstrong Teasdale LLP

(57) ABSTRACT

A turbofan engine assembly includes a core gas turbine engine including a high-pressure compressor, a combustor, and a high-pressure turbine, a low-pressure turbine coupled to said core gas turbine engine, a counter-rotating booster compressor comprising a first rotor section configured to rotate in a first direction and a second rotor section configured to rotate in an opposite second direction, and a gearbox comprising an input and an output, said gearbox output coupled to at least one of said first and second rotor sections, said gearbox input coupled to said low-pressure turbine. A method of assembling the turbofan engine assembly described herein is also provided.

16 Claims, 11 Drawing Sheets

TURBOFAN ENGINE ASSEMBLY AND METHOD OF ASSEMBLING SAME

BACKGROUND OF THE INVENTION

This invention relates generally to gas turbine engines, and more specifically to a turbofan engine assembly that includes a counter-rotating booster compressor.

At least some known turbofan engine assemblies include a fan assembly, a core gas turbine engine, and a low-pressure or power turbine. The core gas turbine engine includes at least one compressor, a combustor, and a high-pressure turbine that are coupled together in a serial flow relationship. Moreover, at least one known turbofan engine assembly includes a booster that is disposed between the fan assembly and the core gas turbine engine.

To improve the efficiency of the turbofan engine assembly, it is desirable to operate the fan assembly at a relatively low speed to improve fan efficiency and to operate the high-pressure turbine at a relatively high speed to improve the high-pressure turbine efficiency. However, operating the fan assembly at a relatively slow speed may be detrimental to the operation of a booster. As such, additional stages may be required on the booster to facilitate operating the booster at maximum efficiency, thus increasing the overall cost and design complexity of the turbofan engine.

BRIEF DESCRIPTION OF THE INVENTION

In one aspect, a method of assembling a turbofan engine is provided. The method includes providing a core gas turbine engine including a high-pressure compressor, a combustor, and a turbine, coupling a counter-rotating booster compressor to the core gas turbine engine, the counter-rotating booster compressor including a first rotor section configured to rotate in a first direction and a second rotor section configured to rotate in an opposite second direction, coupling a gearbox to at least one of the first and second rotor sections, and coupling a low-pressure turbine to the gearbox such that the gearbox is driven by the low-pressure turbine.

In another aspect, a turbofan engine assembly is provided. The turbine engine assembly includes a core gas turbine engine including a high-pressure compressor, a combustor, and a turbine. The turbofan engine assembly also includes a low-pressure turbine coupled to the core gas turbine engine, a counter-rotating booster compressor including a first rotor section configured to rotate in a first direction and a second rotor section configured to rotate in an opposite second direction, and a gearbox including an input and an output, the gearbox output coupled to at least one of the first and second rotor sections, the gearbox input coupled to the low-pressure turbine.

DETAILED DESCRIPTION OF THE INVENTION

Figure 1:
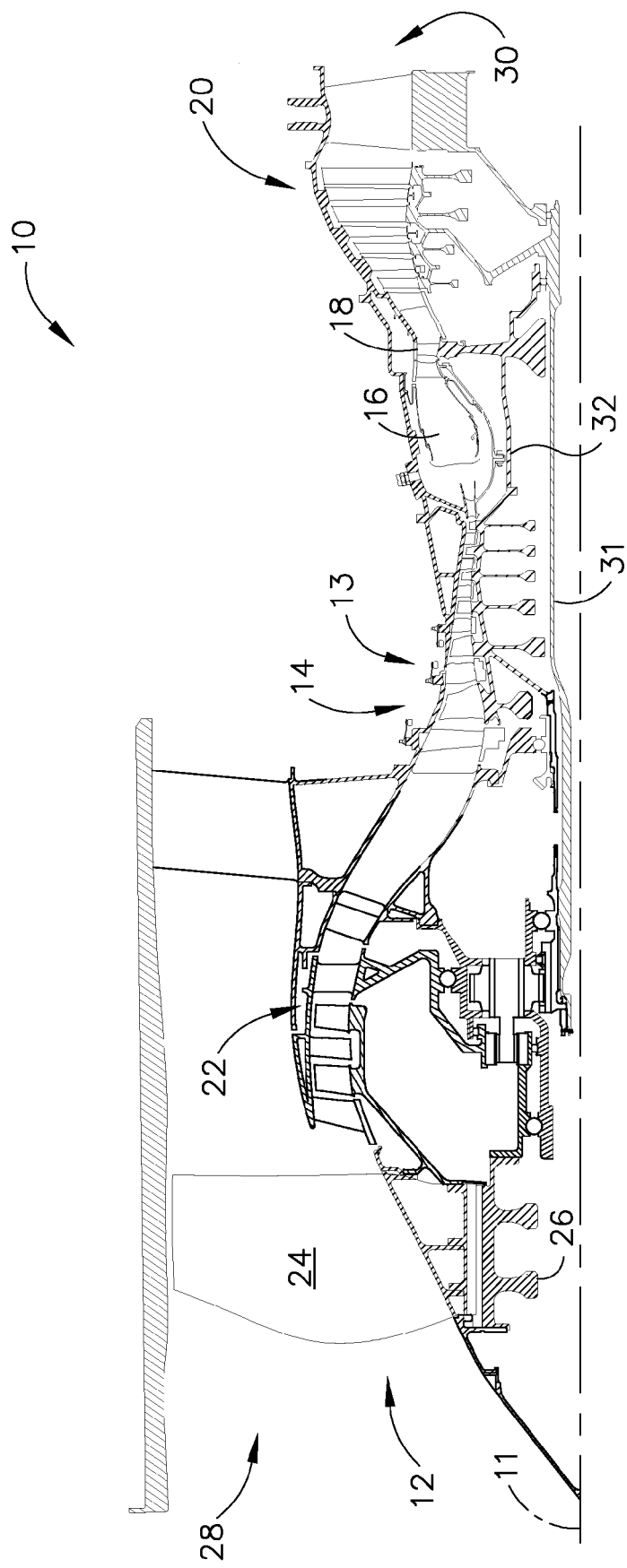
FIG. 1 is a cross-sectional view of a portion of an exemplary turbofan engine assembly that includes a gear driven booster.

FIG. 1 is a schematic illustration of an exemplary turbofan engine assembly 10 having a longitudinal axis 11. Turbofan engine assembly 10 includes a fan assembly 12, a core gas turbine engine 13 that is disposed downstream from fan assembly 12, and a low-pressure turbine 20 that is disposed downstream from the core gas turbine engine. The core gas turbine engine includes a high-pressure compressor 14, a combustor 16, and a high-pressure turbine 18. In the exemplary embodiment, turbofan engine assembly 10 also includes a multi-stage booster compressor 22.

Fan assembly 12 includes an array of fan blades 24 extending radially outward from a rotor disk 26. Turbofan engine assembly 10 has an intake side 28 and an exhaust side 30. Compressor 14 and high-pressure turbine 18 are coupled together by a second drive shaft 32.

Figure 2:
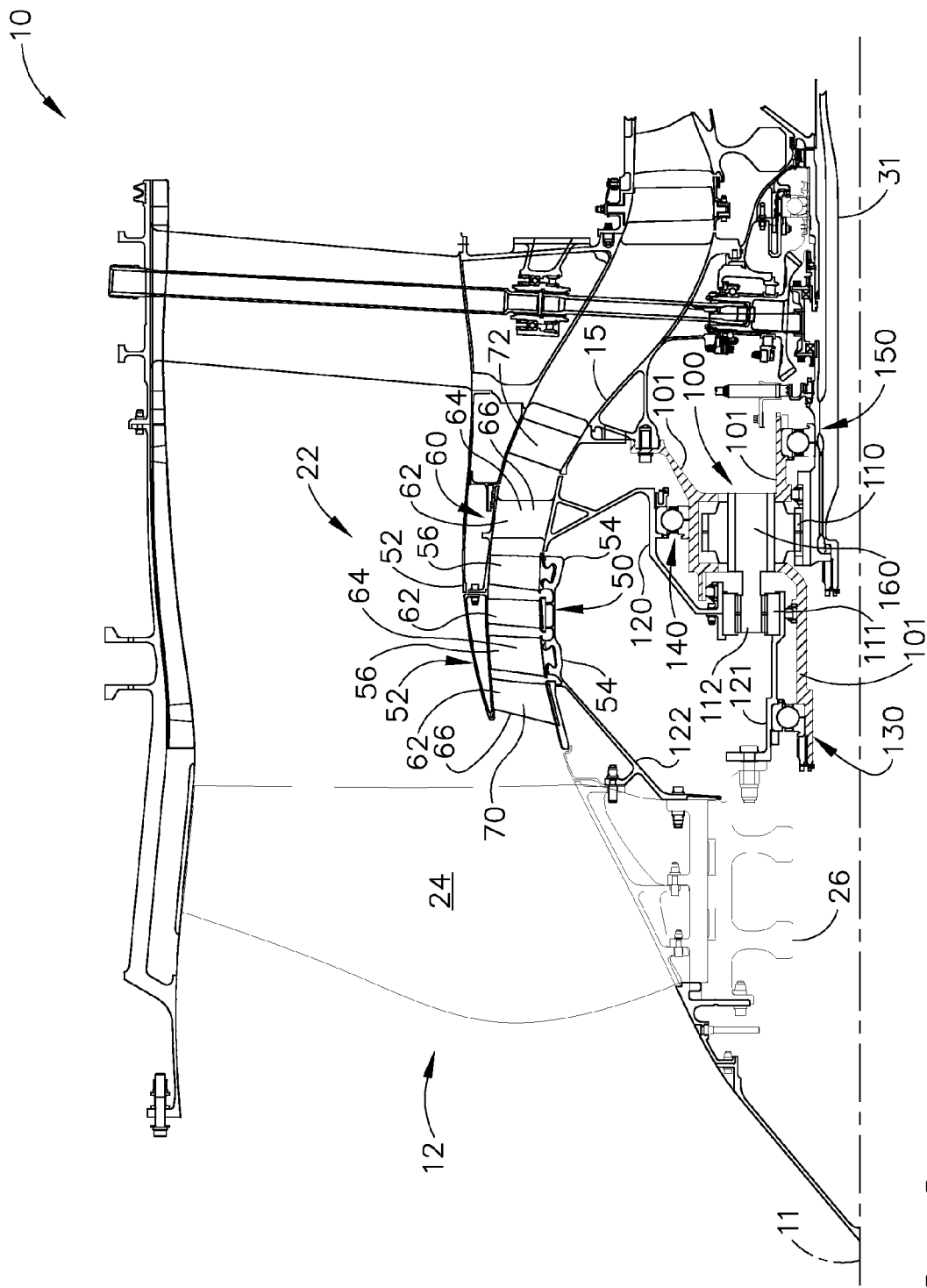
FIG. 2 is an enlarged cross-sectional exemplary booster arrangement that may be utilized with the turbofan engine assembly shown in FIG. 1.

FIG. 2 is an enlarged cross-sectional view of a first booster compressor arrangement that may be utilized with turbofan engine assembly 10 shown in FIG. 1. As shown in FIG. 2, booster 22 is a counter-rotating booster compressor 22 that includes a first rotor section or spool 50 that, in the exemplary embodiment, includes two stages 52 each including a respective disk 54 and a plurality of blades 56 coupled to each respective disk 54. Counter-rotating booster compressor 22 also includes a second rotor section or spool 60 that, in the exemplary embodiment, includes three stages 62 each including a respective disk 64 and a plurality of blades 66 coupled to each respective disk 64. In the exemplary embodiment, a first stage 70 of second rotor section 60 functions as rotating inlet guide vanes (IGV) to facilitate channeling airflow entering turbofan engine assembly 10 downstream through booster 22, and a plurality of stationary vanes 72 function as outlet guide vanes (OGVs). Although booster compressor 22 is shown as having only five stages, it should be realized that booster compressor 22 may have any quantity of stages of rotor blades.

In the exemplary embodiment, turbofan engine assembly also includes a gearbox 100 that includes a gearbox housing 101. Gearbox 100 is a dual output gearbox that includes an input 110, a first output 111, and a second output 112 that is coupled to second rotor section 60. In this embodiment, input 110 is coupled to and driven by shaft 31. First rotor section 50 is coupled to fan assembly 12 using a cone 122, and fan assembly 12 is coupled to first gearbox output 111 using an extension shaft 121. Second rotor section 60 is coupled to second gearbox output 112 utilizing a cone 120. In one embodiment, gearbox 100 has a gear ratio of approximately 2.0 to 1 such that fan assembly 12 and first rotor section 50 each rotate at a rotational speed that is approximately one-half the rotational speed of second rotor section 60. In another embodiment, fan assembly 12 and first rotor section 50 each rotate at a rotational speed that is approximately twice the rotational speed of second rotor section 60. In another exemplary embodiment, gearbox 100 has a gear ratio such that fan assembly 12 and first rotor section 50 each rotate at a rotational speed that is between approximately 0.67 and approximately 2.1 times faster than the rotational speed of second rotor section 60.

Turbofan engine assembly 10 also includes a first bearing assembly 130, that in the exemplary embodiment, is a thrust bearing that is positioned between gearbox housing 101 and fan disk 26 to facilitate transmitting the thrust loads generated by fan assembly 12 to ground, i.e., fan frame 15. Turbofan engine assembly 10 also includes a second bearing assembly 140, that in the exemplary embodiment, is a thrust bearing that is positioned to facilitate transmitting the thrust loads generated by second rotor section 60 to ground, i.e., fan frame 15. Turbofan engine assembly 10 also includes a third bearing assembly 150, that in the exemplary embodiment, is a thrust bearing that is positioned between drive shaft 31 and gearbox housing 101 to facilitate balancing the thrust load generated by low-pressure turbine 20 to ground. As such, gearbox housing 101 ties thrust bearings 130, 140, and 150 to ground independent of the gearbox gearing.

Figure 3:
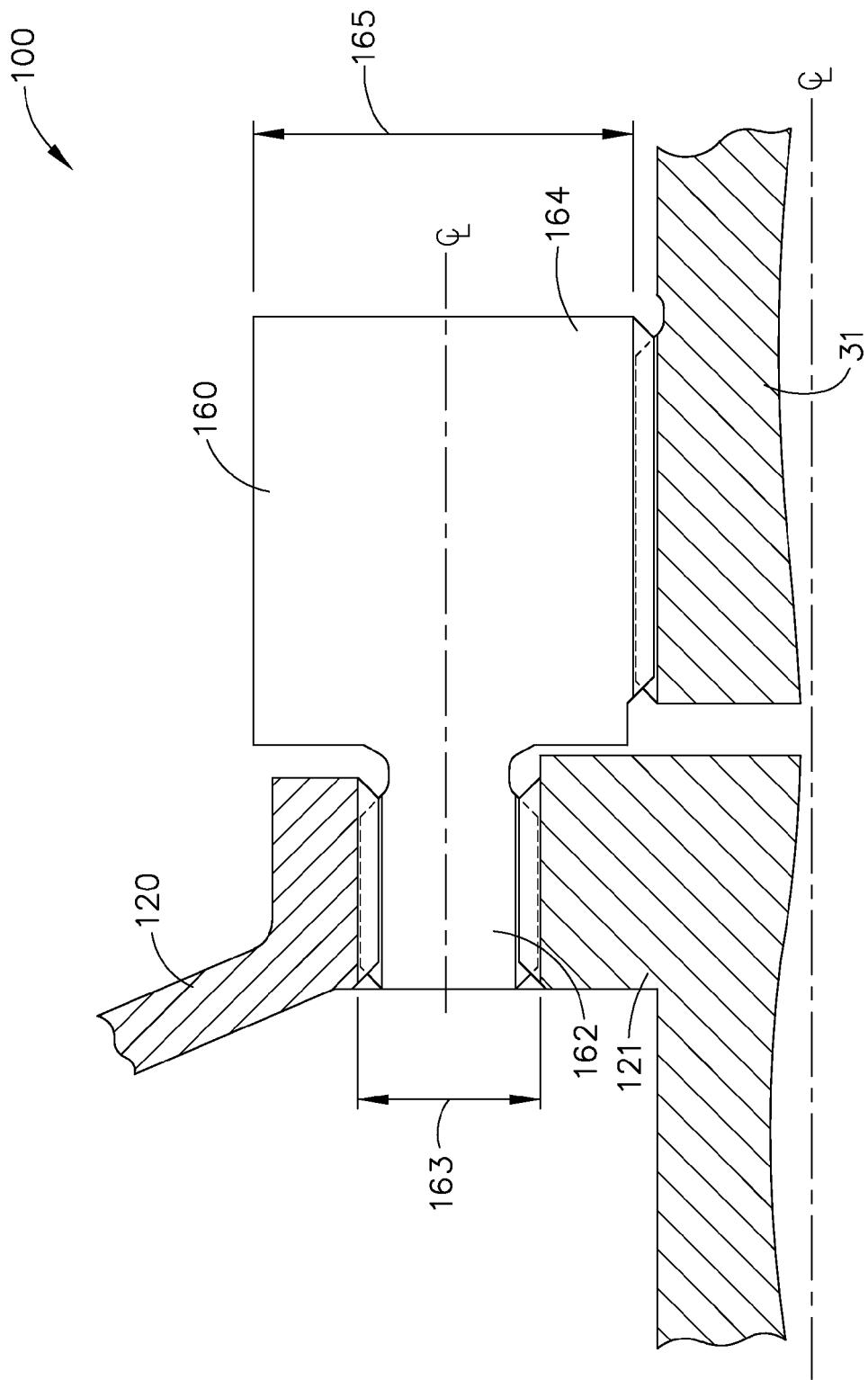
FIG. 3 is a cross-sectional view of a portion of the gearbox shown in FIG. 2.
Figure 4:
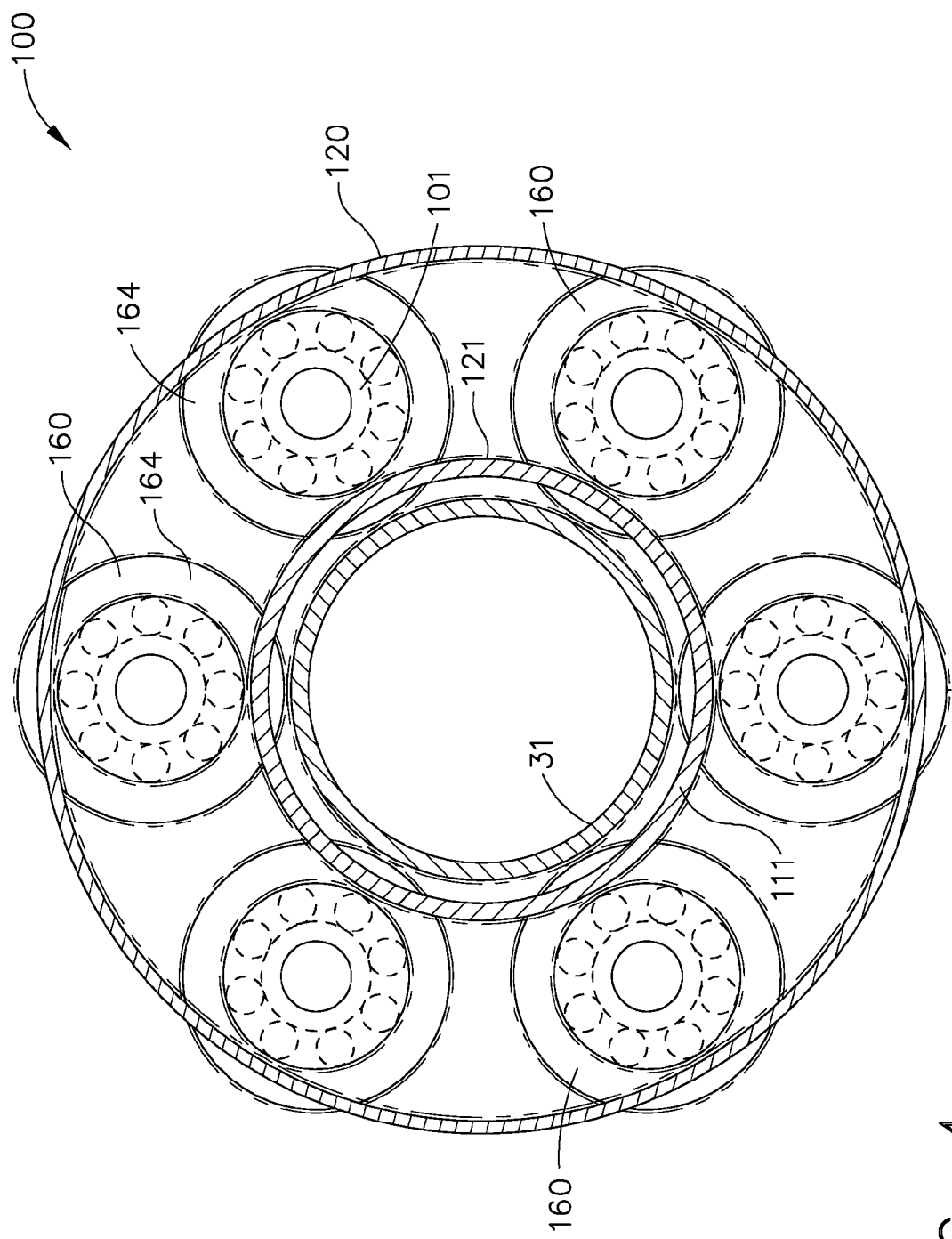
FIG. 4 is an end view of the gearbox shown in FIG. 2.

FIG. 3 is a cross-sectional view of the gearbox 100 shown in FIG. 2. FIG. 4 is an end view of gearbox 100 shown in FIG. 2. As discussed previously herein, gearbox 100 is connected to a fixed or stationary component of turbofan engine assembly 10, such as frame 15 of core turbine engine 13, as shown in FIG. 2. In the exemplary embodiment, gearbox 100 is a planetary gearbox having a substantially toroidal cross-sectional profile such that gearbox 100 substantially circumscribes drive shaft 31. Gearbox 100 includes a set of planet gears 160 cooperating to produce differential speeds. More specifically, each planet gear 160 includes a first gear portion 162 having a first diameter 163 and a second gear portion 164 having a second diameter 165 that is greater than first diameter. In the exemplary embodiment, first and second gear portions 162 and 164 are formed together such that gear 160 is a unitary structure. Optionally, first and second gear portions 162 and 164 are formed separately and coupled together using a fastener, a welding technique, or a brazing technique, for example.

During assembly, fan assembly 12 and first rotor section 50 engage first gear portion 162 via extension shaft 121 and second rotor section 60 engages first gear portion 162 via cone 120. More specifically, as shown in FIG. 4, extension shaft 121 engages the radially inner side of first gear portion 162 and cone 120 engages the radially outer side of first gear portion 162 such that cone 120 and extension shaft 121 each rotate in an opposite direction.

The turbofan engine assemblies described herein each include a counter-rotating (CR) booster compressor that is coupled to a planetary gearbox to enable the speed of each rotor section of the booster compressor to be operated to achieve maximum engine efficiency. In this embodiment, the turbofan engine assembly includes a fan assembly and a counter-rotating booster compressor that are each driven by a gearbox that is driven by the low-pressure turbine. More specifically, the counter-rotating booster has stages 2 and 4 rotating at the same speed as the fan assembly, whiles stages, 1, 3, and 5 counter rotate with a speed that can be higher than the fan speed. This arrangement allows a substantial pressure rise to occur in the booster compressor utilizing a relatively few number of stages.

Figure 5:
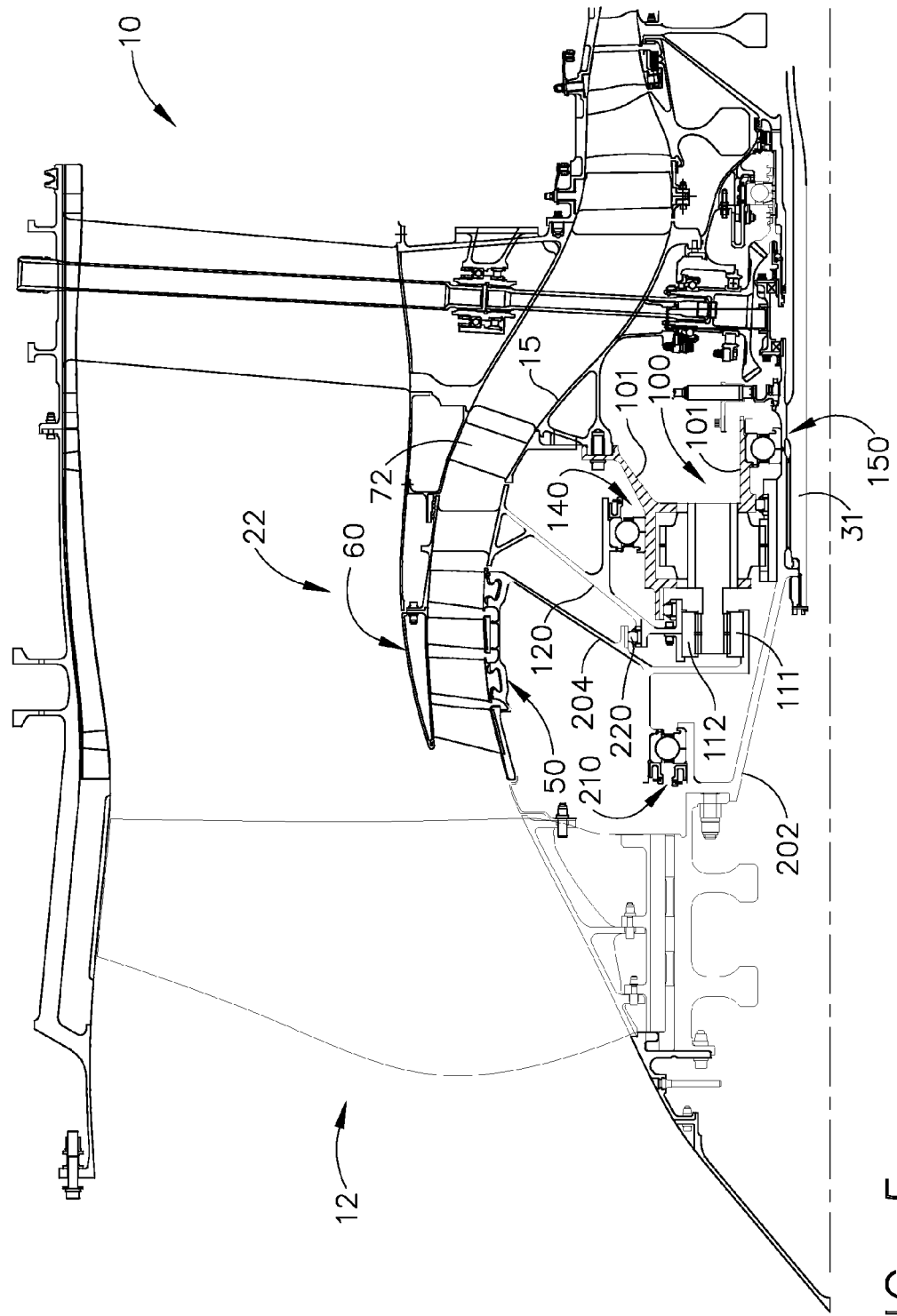
FIG. 5 is an enlarged cross-sectional view of an exemplary booster arrangement that may be utilized with the turbofan engine assembly shown in FIG. 1.

FIG. 5 is an enlarged cross-sectional view of another booster compressor arrangement that may be utilized with turbofan engine assembly 10 shown in FIG. 1. In this arrangement, counter-rotating booster compressor also includes first rotor section or spool 50 that, in the exemplary embodiment, includes two stages 52, and second rotor section or spool 60 that, in the exemplary embodiment, includes three stages 62. In this arrangement, second rotor section 60 is coupled to second gearbox output 112 utilizing cone 120 as shown in FIG. 2. However, in this arrangement, fan assembly 12 is coupled directly to shaft 31, via a shaft extension 202 such that low-pressure turbine 20 (shown in FIG. 1) drives fan assembly 12. Moreover, rather that coupling booster 22 to fan assembly 12, as shown in FIG. 2, booster 22 is coupled to first gearbox output 111 utilizing a cone 204.

As such, in this arrangement, turbofan engine assembly 10 includes a thrust bearing 210 that is positioned between extension shaft 202 and cone 204 to facilitate balancing the thrust loads generated by fan assembly 12 and booster compressor spool 50. Turbofan engine assembly 10 also includes a roller bearing 220 that is positioned between cone 204 and cone 120 to facilitate providing radial support for cone 204. In this arrangement, turbofan engine assembly 10 also includes second bearing assembly 140, that in the exemplary embodiment, is a thrust bearing that is positioned to facilitate transmitting the thrust loads generated by second rotor section 60 to ground, i.e., fan frame 15. Turbofan engine assembly 10 also includes a third bearing assembly 150, that in the exemplary embodiment, is a thrust bearing that is positioned between drive shaft 31 and gearbox 100 to facilitate transmitting the residual thrust load generated by fan assembly 12, booster rotor 50, and low-pressure turbine 20 to ground, via gearbox housing 101.

Figure 6:
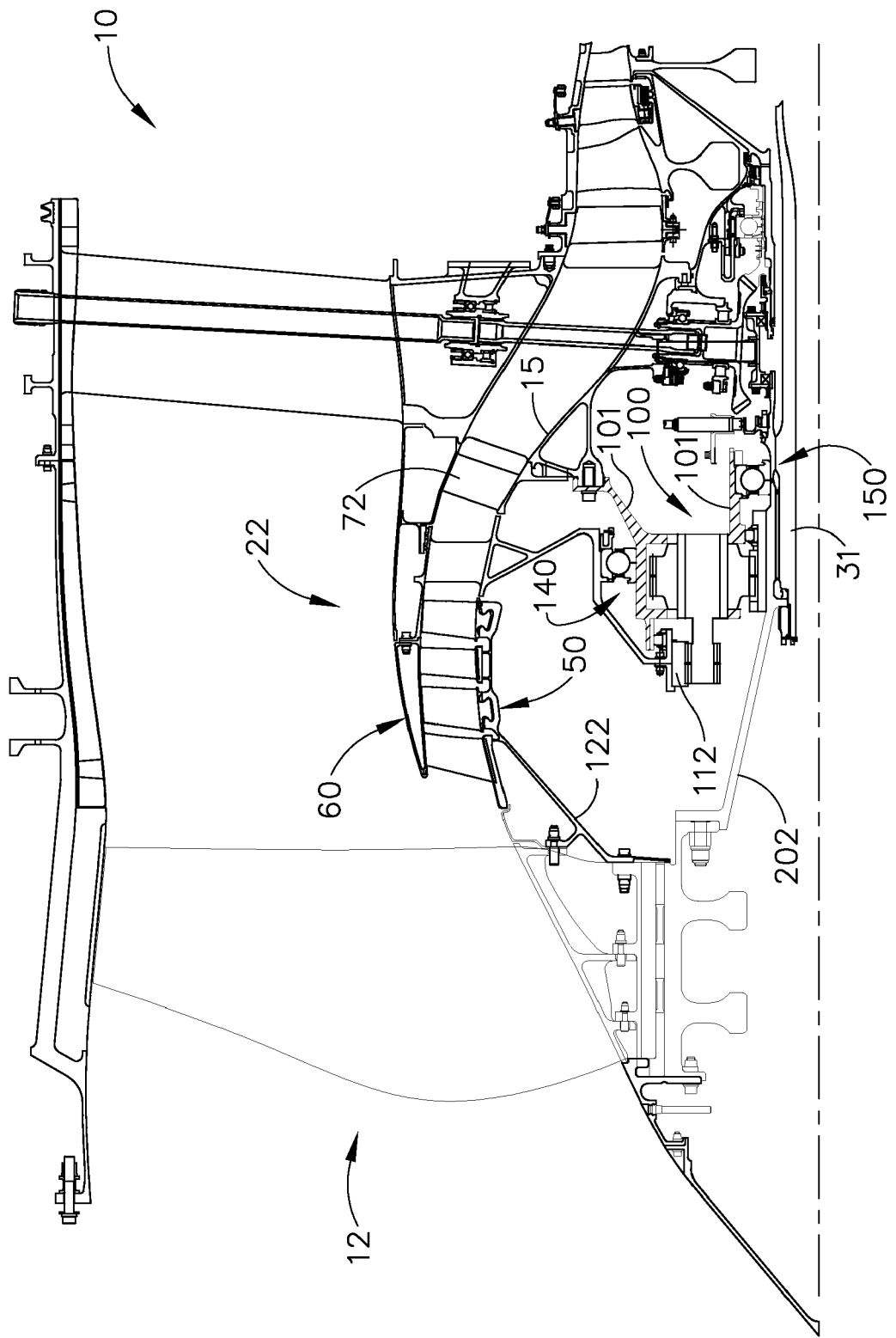
FIG. 6 is an enlarged cross-sectional view of an exemplary booster arrangement that may be utilized with the turbofan engine assembly shown in FIG. 1.

FIG. 6 is an enlarged cross-sectional view of another booster compressor arrangement that may be utilized with turbofan engine assembly 10 shown in FIG. 1. In this arrangement, counter-rotating booster compressor 22 also includes first rotor section or spool 50 that, in the exemplary embodiment, includes two stages 52, and second rotor section or spool 60 that, in the exemplary embodiment, includes three stages 62. In this arrangement, first rotor section 50 is coupled to fan assembly 12 using cone 122, and fan assembly 12 is coupled to shaft 31, via a shaft extension 202 such that low-pressure turbine 20 (shown in FIG. 1) drives fan assembly 12 and booster rotor 50, and such that shaft 31 drives gearbox 100. Moreover, second rotor section 60 is coupled to gearbox output 112.

In this arrangement, turbofan engine assembly 10 also includes second bearing assembly 140, that in the exemplary embodiment, is a thrust bearing that is positioned to facilitate transmitting the residual thrust loads generated by second rotor section 60 to ground, i.e., fan frame 15. Turbofan engine assembly 10 also includes a third bearing assembly 150, that in the exemplary embodiment, is a thrust bearing that is positioned between drive shaft 31 and gearbox 100 to facilitate transmitting the residual thrust load generated by fan assembly 12, booster rotor 50, and low-pressure turbine 20 to ground, via gearbox housing 101. This arrangement includes only two thrust bearings utilized to balance the thrust loads generated by the fan assembly 12, low-pressure turbine 20, and booster compressor 22, and thus provides for a less complex counter-rotating booster compressor that is easier to fabricate, utilizes fewer bearing assemblies, and thus reduces life cycle maintenance costs.

Figure 7:
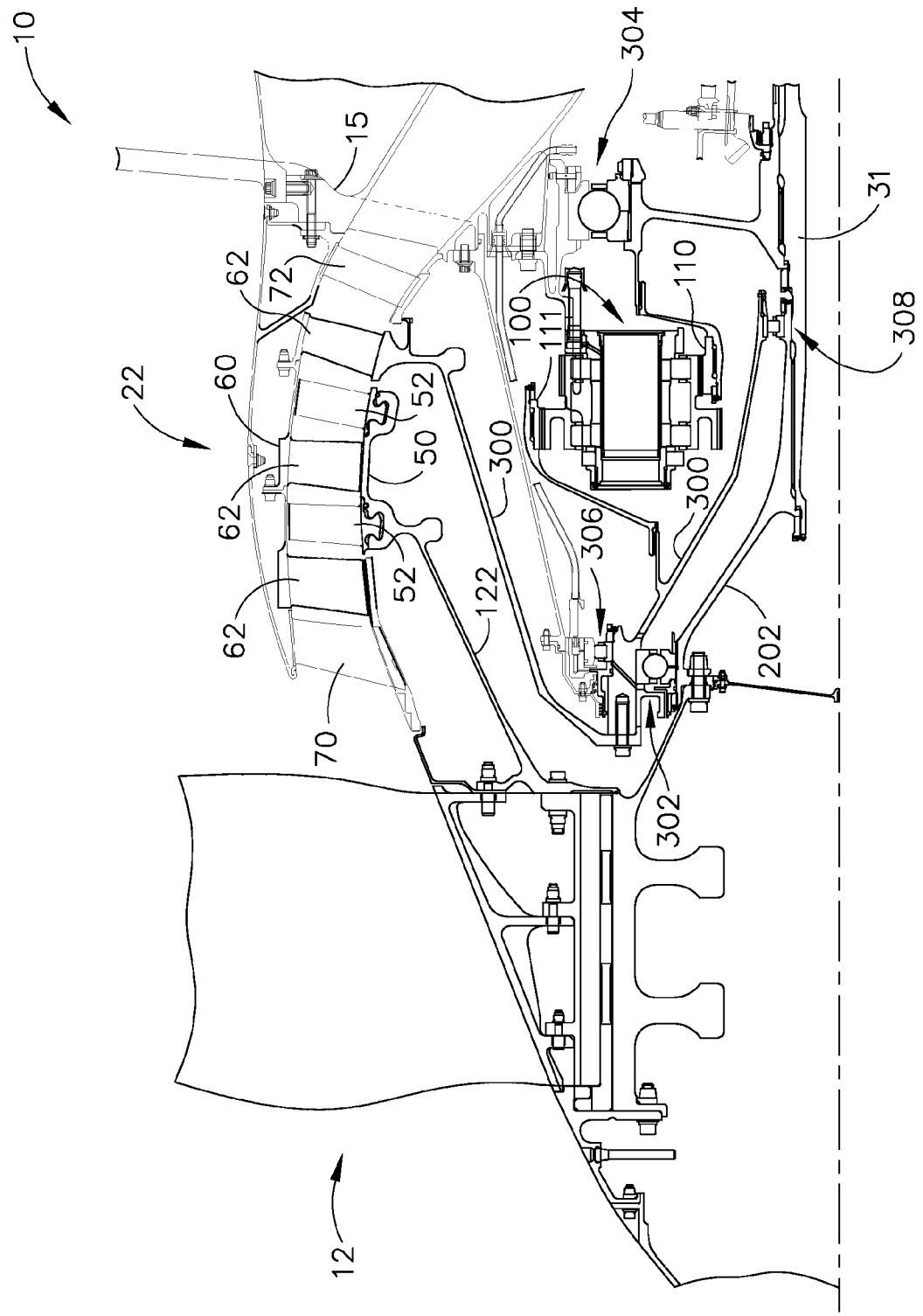
FIG. 7 is an enlarged cross-sectional view of an exemplary booster arrangement that may be utilized with the turbofan engine assembly shown in FIG. 1.

FIG. 7 is an enlarged cross-sectional view of another booster compressor arrangement that may be utilized with turbofan engine assembly 10 shown in FIG. 1. In this arrangement, counter-rotating booster compressor 22 also includes first rotor section or spool 50 that, in the exemplary embodiment, includes two stages 52, and second rotor section or spool 60 that, in the exemplary embodiment, includes three stages 62. In this arrangement, first rotor section 50 is coupled to fan assembly 12 using cone 122, and fan assembly 12 is coupled to shaft 31 using extension shaft 202, and second rotor section 60 is coupled to first gearbox output 111 utilizing a cone 300. Moreover, turbofan engine assembly 10 includes a plurality of stationary inlet guide vanes 70 and a plurality of stationary outlet guide vanes 72 that are coupled to frame 15.

More specifically, in this embodiment, turbofan engine assembly 10 includes a first bearing assembly 302 that is disposed between cone 300 and extension shaft 202, and a second bearing assembly 304 that is disposed between shaft 31 and frame 15. In the exemplary embodiment, bearing assemblies 302 and 304 are each thrust bearings that facilitate balancing the thrust loads generated by fan assembly 12, booster 22, and low-pressure turbine 20, and transmitting the residual thrust load to ground. Turbofan engine assembly 10 also includes a bearing assembly 306 and a bearing assembly 308 that each facilitate providing rotational support to second rotor section 60. Accordingly, bearing assemblies 306 and 308 facilitate maintaining second rotor assembly 60 in a relatively fixed radial position with respect to first rotor section 50. In this embodiment, shaft 31, and thus low-pressure turbine 20, is coupled to gearbox input 110 to drive gearbox 100. Moreover, shaft 31 is coupled directly to fan assembly 12 and first rotor section 50. As a result, gearbox 100 includes a single output, i.e. first output 111 that is utilized to drive second rotor section 60 via cone 300.

Figure 8:
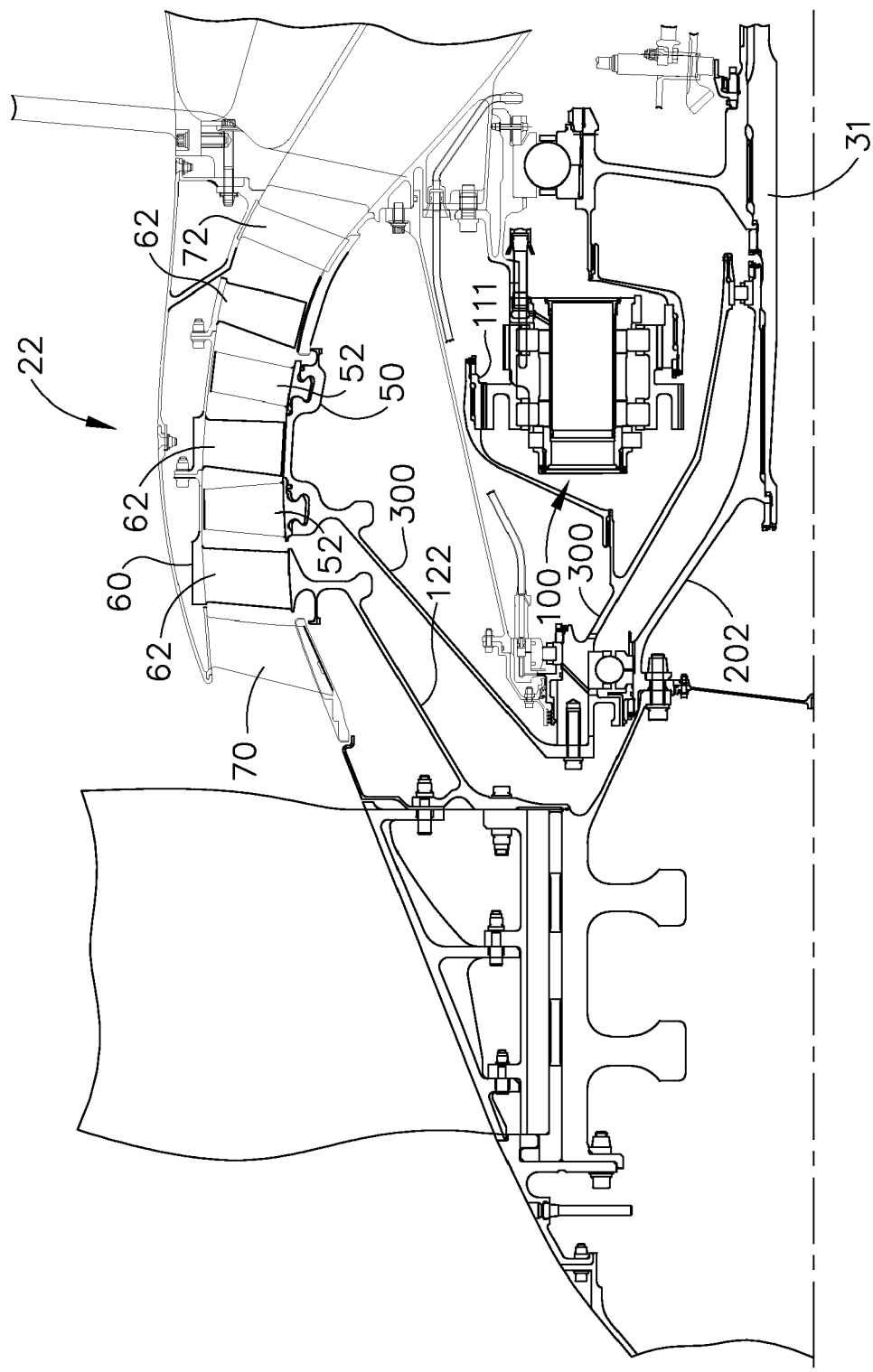
FIG. 8 is an enlarged cross-sectional view of an exemplary booster arrangement that may be utilized with the turbofan engine assembly shown in FIG. 1.

FIG. 8 is an enlarged cross-sectional view of another booster compressor arrangement that may be utilized with turbofan engine assembly 10 shown in FIG. 1. This arrangement is substantially similar to the arrangement illustrated in FIG. 7. However, in this arrangement, counter-rotating booster compressor 22 includes first rotor section or spool 50 that, in the exemplary embodiment, includes two stages 52, and second rotor section or spool 60 that, in the exemplary embodiment, includes three stages 62. In this arrangement, first rotor section 50 is coupled gearbox 100 using cone 300. Moreover, second rotor section 60 is coupled to fan assembly 12 using cone 122, and fan assembly 12 is coupled to shaft 31 using extension shaft 202, and second rotor section 60 is coupled to first gearbox output 111 utilizing a cone 300. As such, gearbox 100 is utilized to drive the radially inner portion of booster compressor 22, i.e. first rotor section 50, and the low-pressure turbine 20 is utilized to drive fan assembly 12 and the radially outer portion of booster compressor 22, i.e. second rotor section 60.

Figure 9:
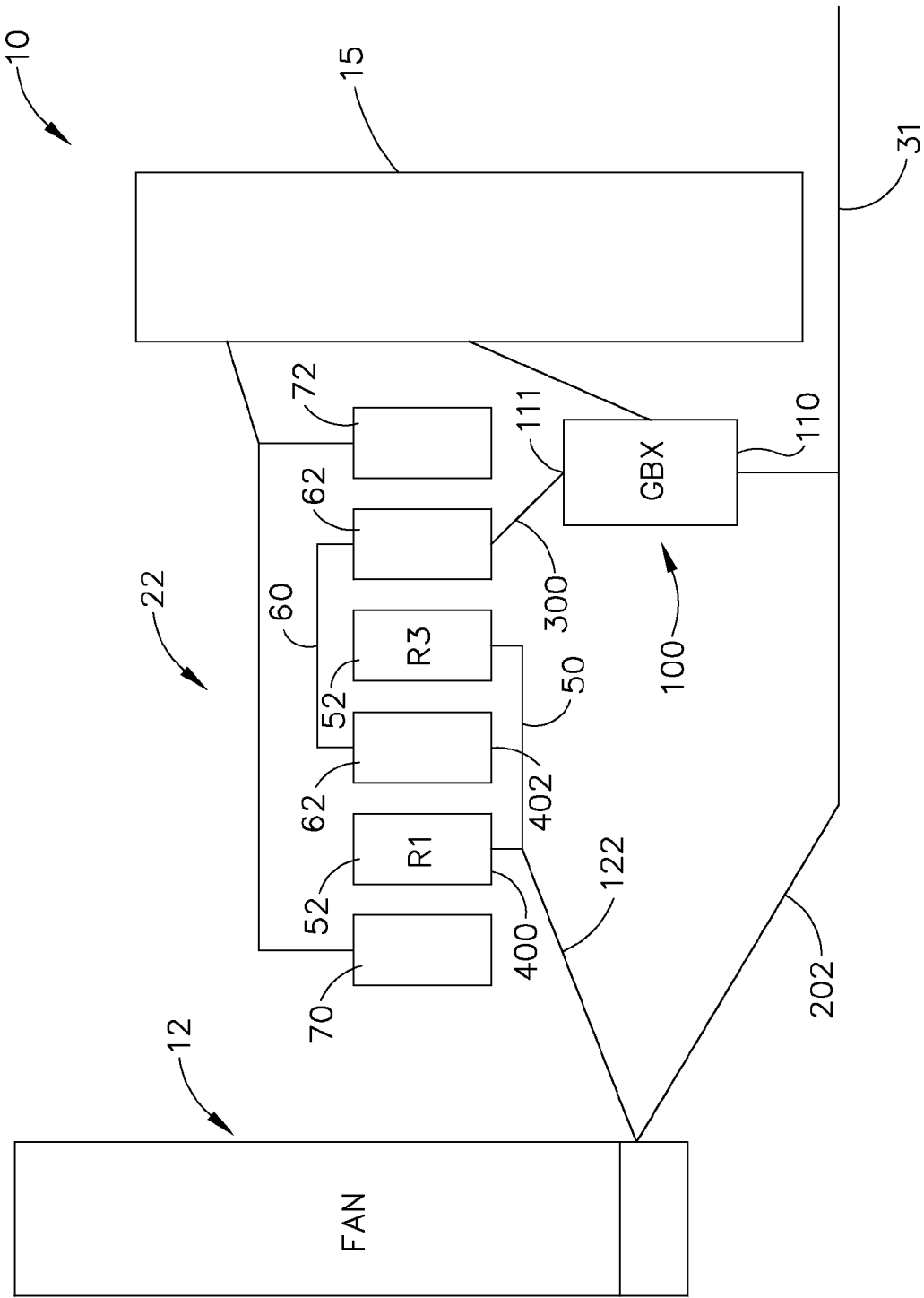
FIG. 9 is a simplified schematic illustration of an exemplary booster arrangement that may be utilized with the turbofan engine assembly shown in FIG. 1.

FIG. 9 is a simplified schematic illustration of another exemplary booster compressor arrangement that may be utilized with turbofan engine assembly 10 shown in FIG. 1. In this arrangement, counter-rotating booster compressor 22 includes first rotor section or spool 50 that, in the exemplary embodiment, includes two stages 52, and second rotor section or spool 60 that, in the exemplary embodiment, includes two stages 62 that are interdigitated with stages 52. In this arrangement, first rotor section 50 is coupled to fan assembly 12 using cone 122 and fan assembly 12 is coupled to shaft 31 using extension shaft 202. Moreover second rotor section 60 is coupled to gearbox 100 using cone 300. As such, gearbox 100 is utilized to drive the radially outer portion, i.e. second rotor section 60, of booster compressor 22, and the low-pressure turbine 20 is utilized to drive fan assembly 12 and the radially inner portion of booster compressor 22, i.e. first rotor section 50. As shown, inlet guide vanes 70 and outlet guide vanes 72 are stationary guide vanes that are coupled to frame 15. Moreover, in this embodiment, a first stage 400 of first rotor section 50 is disposed upstream from a first stage 402 of second rotor section 60.

Figure 10:
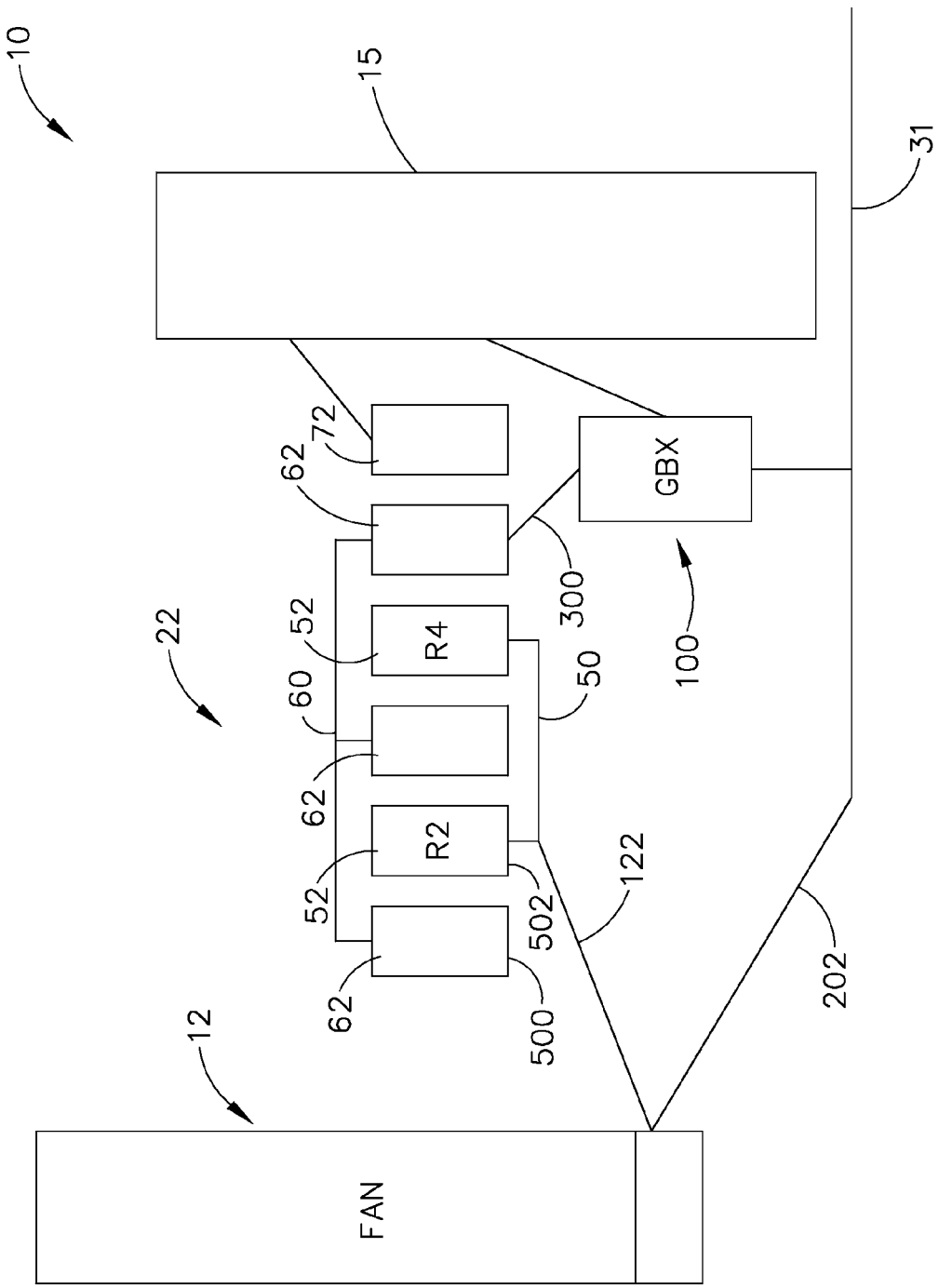
FIG. 10 is a simplified schematic illustration of an exemplary booster arrangement that may be utilized with the turbofan engine assembly shown in FIG. 1.

FIG. 10 is a simplified schematic illustration of another exemplary booster compressor arrangement that may be utilized with turbofan engine assembly 10 shown in FIG. 1. In this arrangement, counter-rotating booster compressor 22 includes first rotor section or spool 50 that, in the exemplary embodiment, includes two stages 52, and second rotor section or spool 60 that, in the exemplary embodiment, includes three stages 62 that are interdigitated with stages 52. In this arrangement, first rotor section 50 is coupled to fan assembly 12 using cone 122 and fan assembly 12 is coupled to shaft 31 using extension shaft 202. Moreover, second rotor section 60 is coupled to gearbox 100 using cone 300. As such, gearbox 100 is utilized to drive the radially outer portion, i.e. second rotor section 60, of booster compressor 22, and the low-pressure turbine 20 is utilized to drive fan assembly 12 and the radially inner portion of booster compressor 22, i.e. first rotor section 50. Moreover, in this embodiment, the first stage 500 of second rotor section 60 is disposed upstream from a first stage 502 of first rotor section 50. Additionally, in this embodiment, first stage 500 is rotatable and function as the inlet guide vanes, whereas outlet guide vanes 72 remain coupled to frame 15, and as such, remain stationary.

Figure 11:
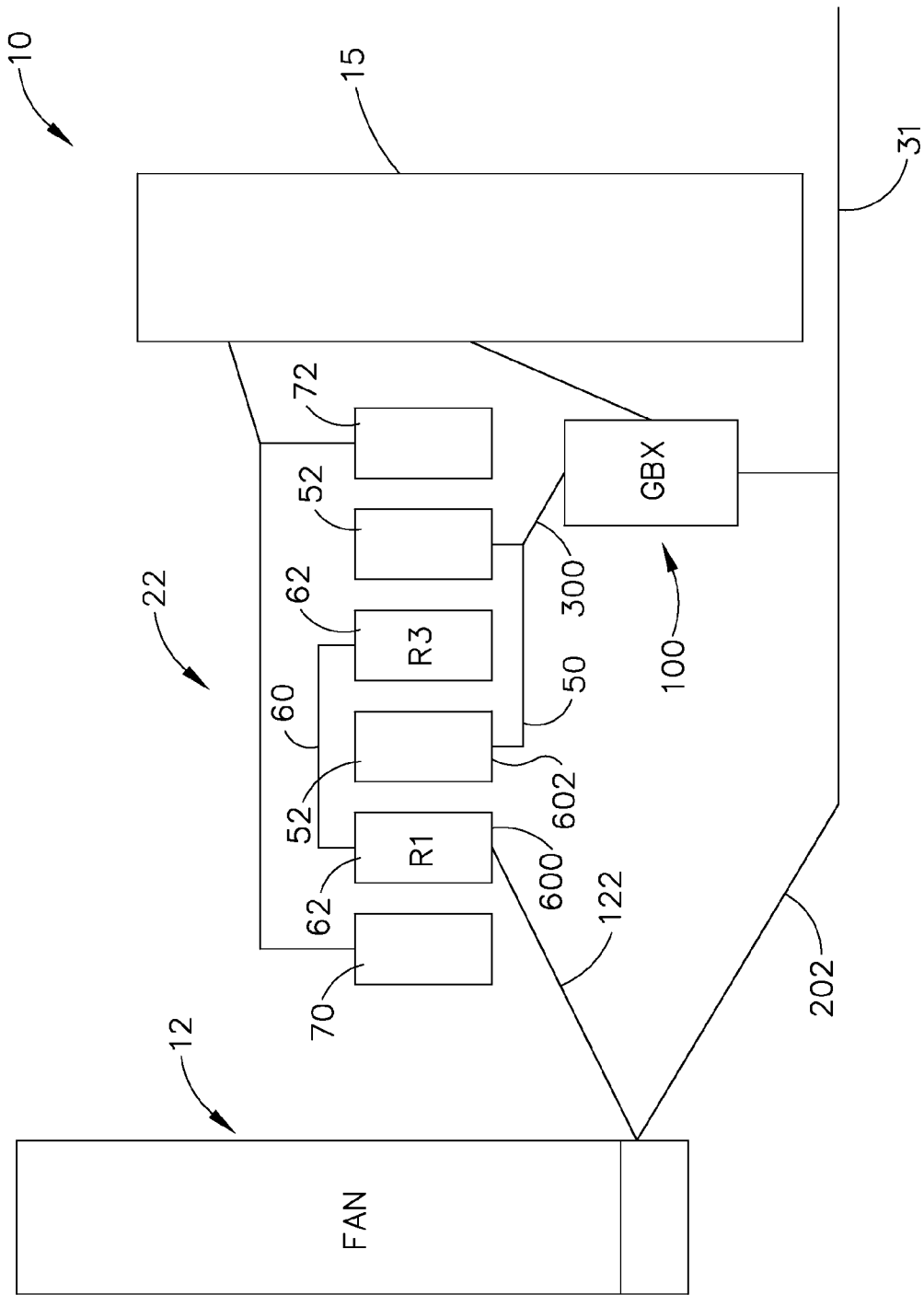
FIG. 11 is a simplified schematic illustration of an exemplary booster arrangement that may be utilized with the turbofan engine assembly shown in FIG. 1.

FIG. 11 is a simplified schematic illustration of another exemplary booster compressor arrangement that may be utilized with turbofan engine assembly 10 shown in FIG. 1. In this arrangement, counter-rotating booster compressor 22 includes first rotor section or spool 50 that, in the exemplary embodiment, includes two stages 52, and second rotor section or spool 60 that, in the exemplary embodiment, includes two stages 62 that are interdigitated with stages 52. In this arrangement, second rotor section 60 is coupled to fan assembly 12 using cone 122 and fan assembly 12 is coupled to shaft 31 using extension shaft 202. Moreover first rotor section 50 is coupled to gearbox 100 using cone 300. As such, gearbox 100 is utilized to drive the radially inner portion, i.e. first rotor section 50, of booster compressor 22, and the low-pressure turbine 20 is utilized to drive fan assembly 12 and the radially outer portion of booster compressor 22, i.e. second rotor section 60. As shown, inlet guide vanes 70 and outlet guide vanes 72 are stationary guide vanes that are coupled to frame 15. Moreover, in this embodiment, the first stage 600 of second rotor section 60 is disposed upstream from a first stage 602 of first rotor section 50.

A method to assemble the turbofan engine assembly described herein includes providing a core gas turbine engine including a high-pressure compressor, a combustor, and a turbine, coupling a counter-rotating booster compressor to the core gas turbine engine, the counter-rotating booster compressor including a first rotor section configured to rotate in a first direction and a second rotor section configured to rotate in an opposite second direction, coupling a gearbox to at least one of the first and second rotor sections, and coupling a low-pressure turbine to the gearbox such that the gearbox is driven by the low-pressure turbine.

The turbofan engine assembly described herein includes a single stage fan assembly, a low-pressure turbine, and a counter-rotating booster compressor. As such, the turbofan engine assembly described herein includes a plurality of arrangements to drive the counter-rotating booster compressor. Specifically, the exemplary turbofan engine assembly includes a geared counter-rotating booster that includes a rotating radially outer portion and a rotating radially inner portion that each include a plurality of blades that are interdigitated to form the counter-rotating booster.

To facilitate reducing the quantity of booster stages while still maintaining a significant pressure rise through the booster compressor, the booster compressors described include a rotating inner portion that may be driven by either the gearbox or directly from the low-pressure turbine, wherein a second rotating portion of the booster compressor may also be driven by the gearbox. As such, the various geared booster compressor arrangements described herein, each facilitate providing a turbofan engine assembly that achieves maximum performance including a low fan pressure ratio and a high bypass ratio with out adding additional stages to the high-pressure compressor, thus reducing the size and cost of the core gas turbine engine.

While the invention has been described in terms of various specific embodiments, those skilled in the art will recognize that the invention can be practiced with modification within the spirit and scope of the claims.

What is claimed is:

1. A method of assembling a turbofan engine assembly, said method comprising:
    providing a core gas turbine engine including a high-pressure compressor, a combustor, and a turbine;
    coupling a counter-rotating booster compressor to the core gas turbine engine, the counter-rotating booster compressor including a first rotor section configured to rotate in a first direction and a second rotor section configured to rotate in an opposite second direction;
    coupling a fan assembly to the core gas turbine engine;
    coupling a gearbox to the first rotor section, the second rotor section, and the fan assembly via gears; and
    coupling a low-pressure turbine to the gearbox such that the first rotor section, the second rotor section, and the fan assembly are driven by the low-pressure turbine via outputs of the gears of the gearbox.

2. A method in accordance with claim 1, further comprising:
    coupling a drive shaft to the low-pressure turbine; and
    coupling the gearbox between the drive shaft and the first rotor section such that the first rotor section rotates at a rotational speed that is different than a rotational speed of the low-pressure turbine.

3. A method in accordance with claim 1, further comprising:
    coupling a drive shaft to the low-pressure turbine; and
    coupling the gearbox between the drive shaft and the second rotor section such that the second rotor section rotates at a rotational speed that is different than a rotational speed of the low-pressure turbine.

4. A method in accordance with claim 1, further comprising:
    coupling a drive shaft to the low-pressure turbine; and
    coupling the gearbox between the drive shaft and the fan assembly such that the fan assembly rotates at a rotational speed that is different than a rotational speed of the low-pressure turbine.

5. A method in accordance with claim 1, further comprising:
    coupling a drive shaft to the low-pressure turbine; and
    coupling a thrust bearing assembly between the low-pressure turbine and the fan assembly to facilitate absorbing thrust loads generated by the low-pressure turbine and the fan assembly and such that residual thrust loads are transmitted to ground.

6. A method in accordance with claim 1, further comprising coupling a planetary gearbox having a substantially toroidal cross-sectional profile to a drive shaft of the low-pressure turbine such that the gearbox substantially circumscribes the drive shaft.

7. A method in accordance with claim 1, further comprising coupling the second rotor section to the gearbox such that the second rotor section rotates in a direction that is opposite to a rotational direction of the fan assembly.

8. A method in accordance with claim 1, wherein the gearbox includes a plurality of gears, each of the gears including a first gear portion having first diameter and a second gear portion having a second different diameter, said method further comprising:
    coupling the first rotor section to the first gear portion; and
    coupling the second rotor section to the second gear portion such that the first rotor section rotates at a first rotational speed and the second rotor section rotates a rotational speed that is less than the first rotational speed.

9. A turbofan engine assembly comprising:
    a fan assembly;
    a core gas turbine engine comprising a high-pressure compressor, a combustor, and a high-pressure turbine;
    a low-pressure turbine coupled to said core gas turbine engine;
    a counter-rotating booster compressor comprising a first rotor section configured to rotate in a first direction and a second rotor section configured to rotate in an opposite second direction; and
    a gearbox having gears coupled to said low-pressure turbine, said first rotor section, said second rotor section, and said fan assembly such that said first rotor section, said second rotor section, and said fan assembly are driven by said low-pressure turbine via outputs of the gears of said gearbox.

10. A turbofan engine assembly in accordance with claim 9, further comprising a drive shaft coupled to said low-pressure turbine, said gearbox coupled between said drive shaft and said first rotor section such that said first rotor section rotates at a rotational speed that is different than a rotational speed of said low-pressure turbine.

11. A turbofan engine assembly in accordance with claim 9, further comprising a drive shaft coupled to said low-pressure turbine, said gearbox coupled between said drive shaft and said second rotor section such that said second rotor section rotates at a rotational speed that is different than a rotational speed of said low-pressure turbine.

12. A turbofan engine assembly in accordance with claim 9, wherein said fan assembly is coupled to said gearbox such that said fan assembly rotates at a rotational speed that is different than a rotational speed of said low-pressure turbine.

13. A turbofan engine assembly in accordance with claim 9, further comprising a thrust bearing assembly coupled between said low-pressure turbine and said fan assembly to facilitate absorbing thrust loads generated by said low-pressure turbine and said fan assembly and transmitting-residual thrust loads to ground.

14. A turbofan engine assembly in accordance with claim 9, wherein said gearbox comprises a planetary gearbox having a substantially toroidal cross-sectional profile, said gearbox substantially circumscribing a drive shaft of said low-pressure turbine.

15. A turbofan engine assembly in accordance with claim 9, wherein said second rotor section is coupled to said gearbox such that said second rotor section rotates in a direction that is opposite to a rotational direction of said fan assembly.

16. A turbofan engine assembly in accordance with claim 9, wherein said gearbox comprises a plurality of gears, each of said gears comprising a first gear portion having first diameter and a second gear portion having a second different diameter, said first rotor section coupled to said first gear portion, and said second rotor section coupled to said second gear portion such that said first rotor section rotates at a first rotational speed and said second rotor section rotates a rotational speed that is less than the first rotational speed.

\* \* \* \* \*